United States Patent Office 3,325,402
Patented June 13, 1967

3,325,402
ADSORPTION COMPLEXES OF ACTIVATED CARBON WITH INSOLUBLE ANTIMICROBIAL COMPOUNDS
Archibald Mortimer Erskine, Berkeley, Calif.
(308 W. Vance St., Wilson, N.C. 27893)
No Drawing. Filed Jan. 17, 1964, Ser. No. 338,318
13 Claims. (Cl. 210—64)

The present invention relates to an antimicrobial composition.

Such water-insoluble compounds as quaternary ammonium salts with antimicrobial properties may be used in granular or finely divided form in filter beds and other devices for removing, inhibiting the growth of and/or the killing of bacteria, fungi and algae. However, these quaternary ammonium salts manifest certain disadvantages in use, such as their high cost per unit of weight, the insufficient surface they present for efficient antimicrobial function, the slight odor and taste they have, and the tendency they have to be carried away with the fluid stream being subjected to antimicrobial action. I have discovered that these insoluble quaternary ammonium salts will adhere most firmly to activated carbon and that the disadvantages referred to above will be overcome, if the ammonium compounds with activated carbon may be prestructure of activated carbon.

My invention involves the physico-chemical combination of activated carbon with substantially insoluble, antimicrobial compounds and especially quaternary ammonium salts by adsorption of these compounds from aqueous colloidal dispersions containing them, or by their formation in situ in the carbon pores from the soluble reactants which produce these compounds.

In accordance with one specific embodiment of the invention, in forming the composition of the present invention, there is dispersed to colloidal dimensions in water a substantially insoluble quaternary ammonium antimicrobial compound, formed by metathesis by the reaction of a water-soluble long chain quaternary ammonium salt and a water-soluble anionic reactant.

The resulting colloidal dispersion in very low concentration, for example, in the range of 0.1 to 0.5%, is stirred with suspended activated carbon granules. The dispersed insoluble quaternary ammonium compound enters the pores of the carbon and is firmly adsorbed therein. The combination is now useful for the filtration and killing of bacteria, fungi and algae, either with or without prior drying.

Similar combinations of these insoluble quaternary ammonium compounds with activated carbon may be prepared by the "in situ" method. In accordance with this method, activated carbon is stirred with a very dilute solution of a water-soluble long chain antimicrobial quaternary ammonium salt until the pores of the carbon are saturated by adsorption of the quaternary salt. The excess of soluble quaternary is then removed by washing with water. The carbon so treated is next stirred with a dilute solution of an alkali metal salt of an anionic compound which forms an insoluble compound with the adsorbed soluble quaternary ammonium salt, such as the sodium salt of a polysaccharide carboxylic acid. After sufficient time has elapsed for penetration of the carbon pores by the anionic reactant and formation of the insoluble product therein, the excess of anionic reactant is removed by washing with water. As in the first method, the product is now ready for antimicrobial uses, either with or without prior drying.

"Substantially insoluble" antimicrobial quaternary ammonium compounds are defined for the purpose of this invention as those having a solubility in water not greater than about 0.1% by weight.

Any of the well-known water-soluble antimicrobial quaternary ammonium salts may be used as the cationic components of the insoluble quaternaries of this invention. Examples of such salts are dodecyl dimethyl benzyl ammonium chloride, N-alkylbenzyl trimethyl ammonium chloride, lauryl isoquinolinium bromide, cetyl dimethyl benzyl ammonium chloride, alkyl ($C_8$–$C_{18}$) dimethyl dichloro benzyl ammonium chloride, octadecyl trimethyl ammonium chloride, dialkyl dimethyl ammonium chloride, alkenyl trimethyl ammonium chloride, alkyl benzyl hydroxyethyl imidazolinium chloride, cetyl pyridinium bromide, and di-isobutyl phenoxy/ethoxy/ethyl dimethl benzyl ammonium chloride.

Types of anions which produce substantially water-insoluble quaternary ammonium salts useful in the present invention are those found, for example in the following classes of compounds:

(1) Polysaccharide carboxylic acids, such as carboxy methyl cellulose, alginic acid, and pectinic acid, as disclosed in my U.S. Patent 2,931,753.

(2) Lignin acids, such as alkali lignin, lignin sulfonic acid, and redwood acid as disclosed in U.S. Patent 2,850,-492.

(3) Polymeric anionic radicals, such as those derived from polyacrylic acid, polymethacrylic acid, and styrene maleic anhydride copolymers, as disclosed in U.S. Patent 2,984,639.

(4) Saccharine, the commercial product having the composition o-sulfobenzoic acid imide, as disclosed in U.S. Patent 2,725,326.

The complexes of the substantially insoluble antimicrobial quaternary ammonium salts with activated carbon according to the present invention are particularly useful in water treatment processes, such as the treatment of potable water for removal of bacteria and fungi, and the treatment of water in swimming pools for the removal of algae. In the latter use, a convenient method of use is the circulation of the water through beds of the activated carbon-insoluble quaternary complex. Similarly, these complexes are useful in air purification systems for the removal and killing of bacteria and the spores of fungi.

The carbon-insoluble quaternary complex described not only has antimicrobic effect on any liquid coming in contact therewith but also serves to remove objectionable odors and tastes from the adsorbed quaternary compound and from the liquid passed into contact with the complex. The insolubility of the quaternary ammonium salts in the complex and the fact that these salts, surprisingly enough, cling most firmly to the pores of the activated carbon, prevents these salts from being washed away, so that the antimicrobic effectiveness of the carbon-insoluble quaternary complex is maintained in use indefinitely.

The following examples illustrate certain ways in which the principle of the invention has been applied, but are not to be construed as limiting the invention.

EXAMPLE 1

200 grams of activated carbon (characterized by a mesh size of 8–30 U.S. Sieve Series, total surface area [nitrogen method] 950–1050 m.$^2$/g., pore volume within particle 0.85 cc./g., iodine number 900 minimum, and ash 8.0% maximum) were suspended in 1.25 liters of a 0.1% colloidal aqueous dispersion of alkylbenzyl trimethyl ammonium alginate. A copious volume of air evolving from the carbon granules indicated displacement of the adsorbed air by the colloidal quaternary ammonium compound. The mixture was stirred frequently for a period of about 16 hours to attain equilibrium. The suspension was then washed twice by decantation with 2 liters of water. The granules were filtered and dried at about 50° C. A substantially quantitative yield of activated carbon with alkylbenzyl trimethyl ammonium alginate adsorbed in its inner pore structure was obtained.

EXAMPLE 2

200 grams of activated carbon, having the characteristics described in Example 1, were suspended in 2 liters of a 1% solution of alkylbenzyl trimethyl ammonium chloride. The mixture was allowed to stand with frequent stirring for a period of about 16 hours to reach equilibrium for the internal adsorption of the soluble quaternary ammonium compound by the carbon. The treated granules were then washed twice by decantation with 2 liters of water to remove excess of unadsorbed quaternary.

The granules were next stirred into 2 liters of a 1% solution of the sodium salt of carboxy methyl cellulose. Stirring was continued at frequent intervals for a period of about 16 hours to allow sufficient time for the anionic reactant to reach all the adsorbed cationic reactant in the pores of the carbon. The suspension was then washed three times by decantation with 2 liters of water each time to remove excess of carboxy methyl cellulose. After filtering, the granules containing the alkylbenzyl trimethyl ammonium salt of carboxy methyl cellulose were dried at about 50° C. The dried product showed a small amount of light brown colored deposit on the surface of the granules, indicating exudation of some of the insoluble quaternary ammonium compound from the pores of the carbon.

EXAMPLE 3

225 grams of activated carbon granules were suspended in 2 liters of a 1% solution of alkylbenzyl trimethyl ammonium chloride. The same procedure was followed as in Example 2 for the formation in situ of the insoluble alkylbenzyl trimethyl ammonium salt of carboxy methyl cellulose within the pores of the activated carbon. Since some quaternary ammonium salts are sensitive to even low heat, which produces a slight decomposition, as indicated in Example 2, the preparation in this example was not heated. The treated granules in the wet condition, as a result, were more efficient in antimicrobial action.

While the invention has been described with particular reference to specific embodiments, it is to be understood that it is not to be limited thereto but is to be construed broadly and restricted solely by the scope of the appended claims.

What is claimed is:

1. A process of purifying a fluid which comprises passing said fluid through a filter mass of granular activated carbon carrying a water-soluble antimicrobial quaternary ammonium salt of a compound of the class consisting of a polysaccharide carboxylic acid, a lignin acid, saccharine, and compounds having polymeric anionic radicals derived from polyacrylic acid, polymethacrylic acid, and styrene maleic anhydride copolymers, adsorbed in the pores of said carbon.

2. A process of making a complex comprising mixing a mass of activated carbon granules in a colloidal dispersion in water of a water-insoluble antimicrobic agent long enough to permit the agent to be thoroughly adsorbed in the pores of the granules and removing the excess colloid solution, said agent being a quaternary ammonium salt of a compound of the class consisting of a polysaccharide carboxylic acid, a lignin acid, saccharine, and compounds having polymeric anionic radicals derived from polyacrylic acid, polymethacrylic acid, and styrene anhydride copolymers.

3. A process of making a complex of activated carbon granules and a water-insoluble antimicrobic agent adsorbed in the pores thereof and resulting from the metathetical reaction of a water-soluble anionic organic ammonium compound and a water-soluble cationic compound, which process comprises mixing a mass of said activated carbon granules with a solution of one of said compounds until the latter compound has been thoroughly adsorbed in the pores of the granules, removing the excess solution, mixing the resulting granules with a solution of the other compound long enough to permit the two compounds to react together and the resulting water-soluble antimicrobic compound to be adsorbed in the pores of said granules, and removing the latter excess solution.

4. The process as described in claim 3, wherein said cationic compound is a quaternary ammonium compound, and said anionic compound is of the class consisting of a polysaccharide carboxylic acid, a lignin acid, saccharine, and compounds having polymeric anionic radicals derived from polyacrylic acid, polymethacrylic acid, and styrene maleic anhydride copolymers.

5. A process of making a complex of activated carbon granules and a water-insoluble antimicrobic agent adsorbed in the pores thereof comprising stirring the granules with a dilute solution of a water-soluble long chain antimicrobial quaternary ammonium salt until the pores of the granules are saturated by adsorption of the quaternary salt, removing the excess quaternary salt from the granules, stirring the granules so treated with a dilute solution of an alkali metal salt of an anionic compound which forms an insoluble compound with the adsorbed soluble quaternary salt until the alkali metal salt has penetrated into the pores of the granules and has reacted with the quaternary salt therein to form said insoluble agent, and removing the excess alkali metal salt solution.

6. A filtering device comprising a mass of granular activated carbon carrying a water-insoluble antimicrobial organic ammonium salt of a compound of the class consisting of a polysaccharide carboxylic acid, a lignin acid, saccharine and compounds having polymeric anionic radicals derived from polyacrylic acid, polymethacrylic acid, and styrene maleic anhydride copolymers, adsorbed in the pores of said carbon.

7. A complex comprising activated carbon and alkylbenzyl trimethyl ammonium alginate adsorbed in the pores thereof.

8. A complex comprising activated carbon and dodecyl dimethyl benzyl ammonium methyl cellulose carboxylate adsorbed in the pores thereof.

9. A complex comprising activated carbon, and a water-insoluble antimicrobial organic ammonium salt of a compound of the class consisting of a polysaccharide carboxylic acid, a lignin acid, saccharine, and compounds having polymeric anionic radicals derived from polyacrylic acid, polymethacrylic acid, and styrene maleic anhydride copolymers, said salt being adsorbed in the pores of said carbon.

10. A complex as described in claim 9, wherein the salt is a quaternary ammonium salt.

11. A complex comprising activated carbon, and a water-insoluble antimicrobal quaternary ammonium salt of a compound of the class consisting of carboxy methyl cellulose, algenic acid and pectinic acid, adsorbed in the pores of said carbon.

12. A complex comprising activated carbon, and a water-insoluble antimicrobial quaternary ammonium salt of a compound of the class consisting of alkali lignin, lignin sulfonic acid and redwood acid, adsorbed in the pores of said carbon.

13. A complex comprising activated carbon, and a water-insoluble antimicrobial quaternary ammonium salt of a compound of the class consisting of polyacrylic acid, polymethacrylic acid, and styrene maleic anhydride, adsorbed in the pores of said carbon.

References Cited

UNITED STATES PATENTS

| | | | |
|---|---|---|---|
| 1,557,234 | 10/1925 | Bechhold | 210—501 |
| 2,283,883 | 5/1942 | Conconi | 210—501 X |
| 2,725,326 | 11/1955 | Shibe et al. | 167—38.5 |
| 2,746,936 | 5/1956 | Plank | 252—410 X |
| 2,802,815 | 8/1957 | Doughty | 260—124 |
| 2,931,753 | 4/1960 | Chesbro et al. | 167—38.5 |
| 2,984,639 | 5/1961 | Stamberger et al. | 260—80 X |

MORRIS O. WOLK, *Primary Examiner.*

E. G. WHITBY, *Assistant Examiner.*